United States Patent [19]

Izeki et al.

[11] Patent Number: 4,480,731

[45] Date of Patent: Nov. 6, 1984

[54] VIBRATION DAMPING APPARATUS

[75] Inventors: Jiro Izeki, Tokyo; Ikuo Shimoda, Fujisawa, both of Japan

[73] Assignee: Oiles Kogyo Kabushiki Kaisha, Japan

[21] Appl. No.: 352,600

[22] Filed: Feb. 26, 1982

[30] Foreign Application Priority Data

Feb. 27, 1981 [JP] Japan ................................. 56-27731
Mar. 20, 1981 [JP] Japan ................................. 56-39612
Apr. 16, 1981 [JP] Japan ................................. 56-57716

[51] Int. Cl.³ ............................................. F16D 57/02
[52] U.S. Cl. ................................... 188/381; 188/290; 188/130; 52/167
[58] Field of Search ............... 188/290, 271, 130, 381, 188/140.1, 378; 267/141, 154, 176; 52/167; 192/58 B; 74/68, 521

[56] References Cited

U.S. PATENT DOCUMENTS

| | | | |
|---|---|---|---|
| 19,595 | 2/1911 | Mills | 188/130 |
| 1,850,876 | 3/1932 | Hezard | 188/130 |
| 3,568,806 | 3/1971 | Butt | 267/154 |
| 3,907,079 | 9/1975 | Chapman | 188/290 |

Primary Examiner—Duane A. Reger
Assistant Examiner—Alvin Oberley
Attorney, Agent, or Firm—Oldham, Oldham, Hudak & Weber Co.

[57] ABSTRACT

Disclosed is a vibration damping apparatus incorporated in the crossing of diagonal members such as braces of a framed structure for damping vibration imparted by external force such as an earthquake or a strong wind. The apparatus comprises a plurality of rotatable members or discs, a resistive body disposed between the discs, and a pair or pairs of link bars causing relative rotation of the discs in response to the impartation of the external force, whereby the vibration is damped by the resistance force of the resistive body resisting to the external force.

6 Claims, 24 Drawing Figures

VIBRATION DAMPING APPARATUS

BACKGROUND OF THE INVENTION

This invention relates to a vibration damping apparatus, and more particularly to an apparatus of the kind above described which is suitable for incorporation in diagonal members such as braces used in a framework of a framed construction.

In a framed construction such as a steel tower, a tall platform or a tall building, impartation of horizontal or lateral vibration thereto produces alternately a tensile force and a compressive force in diagonal members crossing each other.

The vibration damping apparatus according to the present invention is suitable for application to such a framed structure in that it resists against deformation of the diagonal members in the plane of the framework due to such stresses, for example, relatively abrupt deformation of the diagonal members due to an earthquake or a strong wind and absorbs the horizontal vibration imparted to the framed structure to damp the amplitude of vibration thereby making the framed structure vibration-proof.

BRIEF SUMMARY OF THE INVENTION

It is a first object of the present invention to provide a vibration damping apparatus which comprises a plurality of rotatable members, a resistive body disposed between these rotatable members, and a plurality of link bars causing relative motion of the rotatable members, and in which a material having a high viscosity is used as the resistive body to utilize the viscous shearing resistance of the highly viscous material for vibration damping.

A second object of the present invention is to provide a vibration damping apparatus which comprises a plurality of rotatable members, a resistive body disposed between these rotatable members, and a plurality of link bars causing relative motion of the rotatable members, and in which a resilient member is used as theresistive body to utilize the deformation resistance of the resilient member for vibration damping.

A third object of the present invention is to provide a vibration damping apparatus which comprises a plurality of rotatable members, a resistive body disposed between these rotatable members, and a plurality of link bars causing relative motion of the rotatable members, and in which a material having a high viscosity is used in combination with a resilient member to provide the resistive body so as to utilize the viscous shearing resistance of the highly viscous material and the deformation resistance of the resilient member for vibration damping.

According to the present invention, there are at least two rotatable members disposed opposite to each other so as to be rotatable around the same axis of rotation while defining a very small gap therebetween.

Unless otherwise desired, the rotatable members are generally provided in the form of discs having their centers aligned on the same axis of rotation, since the opposing surfaces of the members, especially, the effective surface areas of the members having the resistive body (described later) disposed therebetween are preferably circular from the aspects of design, manufacture and handling.

The adjoining ones of these rotatable members rotate in directions opposite to each other around the common axis of rotation in response to impartation of turning force from the line bars which will be described in detail later.

When the number of the rotatable members is two, they rotate in directions opposite to each other, and when the number of the members is three or more, they rotate alternately in directions opposite to one another. More precisely, when the number of the members is three or more, the alternate ones of them rotate in a group in a direction opposite to the direction of rotation of the remaining one or a group of the remaining ones.

The rotatable members belonging to each of groups may be connected together by suitable connecting means, and one of the link bars may be coupled to the connecting means connecting each group of the rotatable members to permit relative rotation of the rotatable members. This is a preferred mode especially when the number of the rotatable members is more than three.

At least two link bars constitute a link bar group, and these link bars are coupled to the rotatable members by one of two methods. According to the first method, the link bars are pivoted at one end thereof to each other by a pin and are directly coupled to the respective rotatable members at the other end thereof so as to function as openable legs. Alternatively, the link bars are indirectly coupled to the rotatable members through connecting means each of which connects alternate ones of the rotatable members as a group.

Only one group of the link bars may be coupled to the rotatable members, or two groups may be disposed in a relation diametrically opposite to each other in the diametrical direction of the rotatable members, or four groups of similar arrangement may be disposed. However, the arrangements above described are not necessarily required depending on the application.

The link bars in the same group or in all the groups need not have the same length. The link bars of such lengths may be coupled to the rotatable members in such a relation that the line bisecting the angle defined between the openable legs of the link bars passes at least through the common center of rotation of the rotatable members.

In such a mode, however, those rotatable members rotating in the directions opposite to each other may not rotate with a uniform rotation angle and a uniform angular velocity, and the amount and rate of displacement of the pivoted end of one of the link bar group movable toward and away from the common center of rotation of the associated rotatable members may be different from those of the pivoted end of another link bar group. Further, these differences and the degree thereof are governed by the combination of the shorter ones of the drivers and followers including the common center of rotation of the rotatable members and the pivoted end of the link bars in the quadric crank mechanisms constituted by the link bar groups and the associated rotatable members.

Therefore, it is more practical and preferable from the aspect of design that the link bars in the same group or in all the groups have the same length, and the line bisecting the angle defined between the openable legs of the link bars passes through the common center of rotation of the rotatable members.

According to the second method, four link bars are employed and are pivoted to each other by pins at their ends so as to constitute a quadric crank mechanism which can turn around the axes of the pins. The two link bars disposed opposite to each other among the four link bars are coupled at their middle points to the corresponding points of one of two rotatable members respectively, which points are located near the periphery of the roatable member and spaced apart by the same distance from the center of rotation of the rotatable member, or such link bars are coupled at their middle points to connecting means connecting together, as a group, the alternate ones of the rotatable members rotating in the same direction. Similarly, the remaining two link bars disposed opposite to each other are coupled at their middle points to the corresponding points of the other rotatable member respectively, which points are located near the periphery of the rotatable member and spaced apart by the same distance from the center or rotation of the rotatable member, or such link bars are coupled at their middle points to connecting means connecting together, as a group, the alternate ones of the rotatable members rotating in a direction opposite to the direction of rotation of the former group.

In such an assembly of the quadric crank mechanism and rotatable members, deformation of the quadric crank mechanism can be converted into relative rotation of the rotatable members in the opposite directions, provided that the distance between the center of rotation of each of the rotatable members and the coupled point at the middle of each of the link bars is equal to the distance between the coupled point and the pivoted points of each of the link bars.

According to the present invention, the resistive body disposed between the rotatable members is preferably a material having a high viscosity, a resilient member or the combination of them.

The highly viscous material is filled or charged in the very small gap defined between the rotatable members. As preferred examples of the highly viscous material to be employed in the present invention, high-molecular fluid materials, for example, liquid polyolefines, liquid polysiloxane and hydrocarbons such as tars can be cited. A highly viscous material having a coefficient of viscosity as high as several thousand or several ten thousand poises is especially recommended for use in a vibration damping apparatus incorporated in diagonal members of a framed structure.

The viscous shearing resistance force F of a highly viscous material filled or charged in a gap between plates is generally expressed as $$F = KS(V/C)^m$$

where S is the area of the opposing surfaces of the plates (the substantially effective areas holding the highly viscous material therebetween), V is the velocity of relative movement of the plates (the velocity of vibration), C is the dimension of the gap between the plates, K is a constant determined by the coefficient of viscosity of the viscous material used, and m is a coefficient determined by the property of the viscous material.

Each of the fluid materials above cited exhibits the behaviour of non-Newtonian flow. The inventors have experimentally confirmed that the value of m of such a material is less than unity (1) and, especially, in the case of a liquid polyolefine, the value of m is close to 0.5.

It will be understood from the expression $F = KS(V/C)^m$ that the highly viscous material generates a resistance force F proportional to the m-th power of the velocity of the plates moving relative to each other. The value of m less than unity (1) indicates that the curve of resistance force rises exponentially with time, and this means that the vibration damping apparatus can reliably and stably produce the resistance force resisting the momentary and abrupt vibration caused by, for example, an earthquake.

When such a highly viscous material is filled or charged in the very small gap defined between the rotatable members, the viscous shearing torque T produced due to the relative rotation of the rotatable members is expressed as $$T = \frac{2\pi K \omega^m}{n+3}(r_0^{n+3} - r_1^{n+3})$$

where $\omega$ is the relative angular velocity of the rotatable members, $r_0$ is the outer diameter of the viscous shearing area, $r_1$ is its inner diameter, and K and m are the constants defined hereinbefore. It will thus be seen that relative rotation of the rotatable members produces a torque T proportional to the m-th power of the relative angular velocity $\omega$.

The resilient member employed in the present invention is preferably in the form of resilient rubber or a spring. Such a resilient member is disposed between the rotatable members rotating in the directions opposite to each other so as to impart a predetermined restraining force restraining the relative movement of the rotatable members.

The resilient member of rubber is, for example, in the form of an annular rubber ring having a rectangular cross section. Such a ring is secured at its side surfaces to the corresponding portions of the opposing surfaces of the rotatable members as by an adhesive while its inner and outer peripheral surfaces are not restrained to be left free, or such a ring is secured at its inner and outer peripheral surfaces to diametrically opposite annular surface portions previously formed in the opposing surfaces of the rotatable members, as by an adhesive, while its side surfaces are not restrained to be left free.

In order to facilitate securing of the resilient member of rubber to the rotatable members and also to produce a uniform torsional shearing stress in the resilient member of rubber, sheets such as thin metal sheets may be integrally molded on the side surface or inner and outer peripheral surfaces of the rubber ring during vulcanization, and the rubber ring may then be bonded to the rotatable members through the thin metal sheets. This is one of recommended means.

Another mode may be employed in which concavities, convexities or any other engaging means may be provided on these thin metal sheets for the purpose of mechanical engagement with the rotatable members. The requirement is that a resiliently deformable portion is left in the resilient member of rubber, and the remaining portion of the resilient member of rubber is secured to the relatively-rotating rotatable members to restrain the relative motion of the rotatable members, thereby producing a torsional shearing stress in the resilient member of rubber.

The torsional shearing force F of the resilient member of rubber is expressed as $$F = t \cdot \phi \cdot a \cdot K_\phi$$

where $\phi$ is the rotation angle, $a$ is a constant determined by the dimensions and mounting angle of the ring, and $K_\phi$ is a spring constant of the resilient member.

Thus, the force F proportional to the rotation angle φ, hence, the force corresponding to the "displacement" (moved distance) of the rotatable members is produced.

Another resilient member is a spring in the form of a metal ring having part of its ends suitably cut out.

Such a spring is so disposed that one of the cut-out ends is anchored by suitable means to one of the rotatable members, and the other of the cut-out ends is also anchored by suitable means to the other rotatable member.

The ring spring may be such that the cut-out ends lie on the same circumference or cross each other in the cirumferential direction in a spiral fashion.

The resilient member in the spring form also produces the force F proportional to the rotation angle, hence, the force corresponding to the "displacement" (moved distance), as in the case of the resilient member of rubber.

The resilient member differs from the aforementioned highly viscous material in that it imparts a restoring force to the rotatable lmembers when the latter have rotated through a predetermined angle.

Therefore, the highly viscous material and the resilient member embodying the two forms of the resistive body may be singly employed or may be employed in combination to suit specific applications considering their properties. Therefore, it is preferable to employ the combination of these resistive bodies when the vibration damping apparatus is specifically incorporated in diagonal members of a framed structure using such diagonal members.

Other objects, features and advantages of the present invention will be apparent to those skilled in the art from the following detailed description of preferred embodiments thereof taken in conjunction with the accompanying drawings.

BRIEF DESCRIPTION OF THE DRAWINGS

FIG. 15 is a sectional view of part of the apparatus to illustrate another manner of disposition of the annular resilient member of rubber in the seventh embodiment of the present invention shown in FIG. 14a.

DETAILED DESCRIPTION OF THE INVENTION

Figure 1:
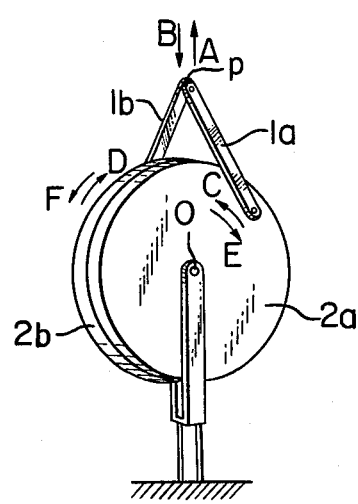
FIG. 1 is a schematic perspective view of a first embodiment of the vibration damping apparatus according to the present invention.

FIG. 1 is a schematic perspective view of a first embodiment of the vibration damping apparatus according to the present invention which comprises two rotatable members or discs, and a pair of link bars of equal length coupled to the discs in such a relation that the line bisecting the angle defined between the openable legs of the link bars passes through the common center O of rotation of the discs. The discs are supported at their common central axis on another member which is stationary, and a load is imparted to the pivoted point P of the discs.

Referring to FIG. 1, a pair of link bars 1a and 1b of equal length are pivoted to each other at a point P and coupled to two discs 2a and 2b respectively. Impartation of a force to the pivoted point P in a direction shown by the arrow A urges the point P in the same direction, and a force tending to close the openable legs of the link bars acts upon the link bars 1a and 1b. Consequently, the discs 2a and 2b coupled to the link bars 1a and 1b respectively are rotated in directions opposite to each other, that is, in directions shown by the arrows C and D respectively around their common central axis O. On the other hand, impartation of a force to the point P in a direction shown by the arrow B urges the point P in the same direction, and a force tending to open the openable legs of the link bars acts upon the link bars 1a and 1b, so that the discs 2a and 2b are rotated in directions opposite to each other, that is, in directions shown by the arrows E and F respectively around the common central axis O. A resistive body is disposed in a very small gap defined between the discs 2a and 2b.

Thus, a crank mechanism is formed in which the link bars 1a, 1b function as the driver and the discs 2a, 2b function as the follower. The open-close motion of the link bars functioning as the driver is converted into relative rotation of the discs functioning as the follower. As a result of this relative rotation, a resistance force is generated by the resistive body disposed in the gap between the discs 2a and 2b functioning as the follower, thereby damping the amplitude of vibration imparted to the pivoted point P of the link bars 1a and 1b functioning as the driver.

Figure 2:
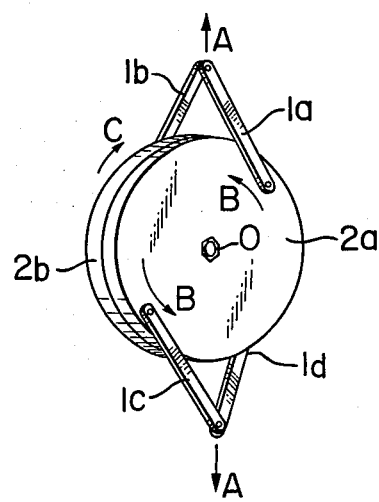
FIG. 2 is a schematic perspective view of a second embodiment of the present invention.

FIG. 2 is a schematic perspective view of a second embodiment of the vibration damping apparatus according to the present invention in which two pairs of link bars 1a, 1b and 1c, 1d are disposed opposite to each other in the diametrical direction of two discs 2a and 2b, and the openable legs of one of the pairs of the link bars extend in the same direction as the direction of extension of the corresponding openable legs in the other pair. In the second embodiment shown in FIG. 2, the disc 2a and 2b may be or may not be supported at their common central axis O on another member which is stationary.

Figure 3:
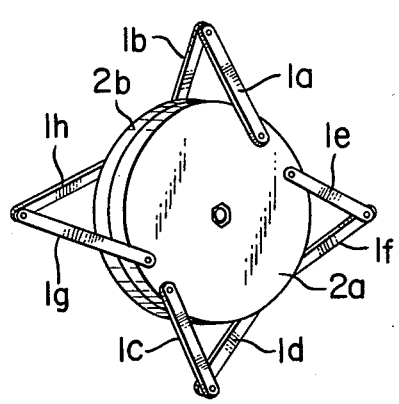
FIG. 3 is a schematic perspective view of a third embodiment of the present invention.

FIG. 3 is a schematic perspective view of a third embodiment of the vibration damping apparatus according to the present invention which comprises two discs 2a, 2b and four pairs of link bars 1a, 1b; 1c, 1d; 1e, 1f; and 1g, 1h. In the third embodiment shown in FIG. 3, the two link bar pairs among the four pairs are disposed opposite to each other in the diametrical direction of the discs 2a and 2b, and the remaining two link bar pairs are also similarly disposed. The openable legs of the link bars in the two opposing pairs extend in the same directions as described with reference to FIG. 2, but those of the adjoining link bars in the different pairs extend in different directions as seen in FIG. 3.

The line connecting between the pivoted points of the two opposing link bar pairs crosses at right angles with that connecting between the pivoted points of the remaining two opposing link bar pairs in FIG. 3. A modification of the third embodiment is shown in FIG. 4 in which it will be seen that the ends of the openable legs of the adjoining link bars in the different pairs are coupled by pins to the same discs respectively.

Figure 4:
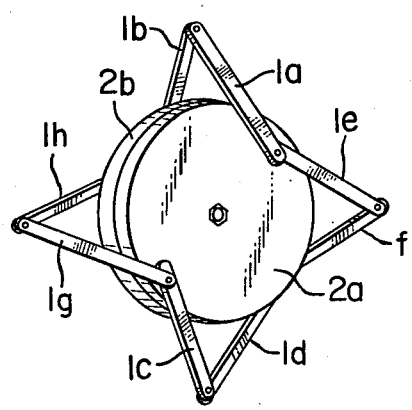
FIG. 4 is a schematic perspective view of a modification of the third embodiment shown in FIG. 3.

In the embodiments shown in FIGS. 3 and 4 too, the discs 2a and 2b may be or may not be supported at their common central axis O on another member which is stationary. Especially, when the pivoted point of each link bar pair is coupled to the cross point of two diagonal members in a framed structure, it is preferable that the common center O of rotation of the discs is supported in space by the diagonal members under tension without supporting it on another stationary member.

In such embodiments of the present invention applied to the cross point of the two diagonal members, the incorporation of the apparatus at the cross point would not lead to an unbalance between the tensions of the two diagonal members during the stage of erection in which the tension is imparted to each of the diagonal members. This is because one of the discs rotates through a very small angle relative to the other in either direction to maintain constant the tensions of the diagonal members.

Figure 5:
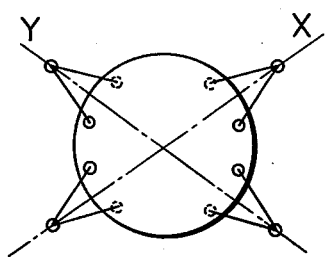
FIGS. 5 and 6 are diagrammatic views of modifications of the apparatus shown in FIGS. 3 and 4, respectively.
Figure 6:
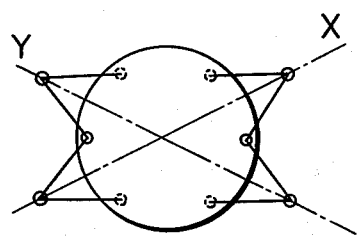

FIGS. 5 and 6 are diagrammatic views showing modifications of the embodiments shown in FIGS. 3 and 4 respectively. It will be seen in FIGS. 5 and 6 that the lines X and Y connecting between the opposing link bar pairs do not cross at right angles with each other.

In such embodiments, one of the link bars in the pair defining an acute angle therebetween and the adjoining one in the similar pair may be coupled to the same disc by a common pin.

Figure 7:
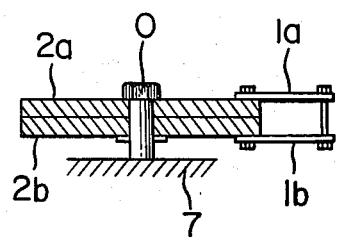
FIG. 7 is a longitudinal sectional view of a modification in which the common center of rotation of the rotatable members or discs is fixed to a stationary member.

FIG. 7 shows a modification in which the discs 2a and 2b are supported at the common center O of rotation on another member 7 which is stationary.

Figure 8:
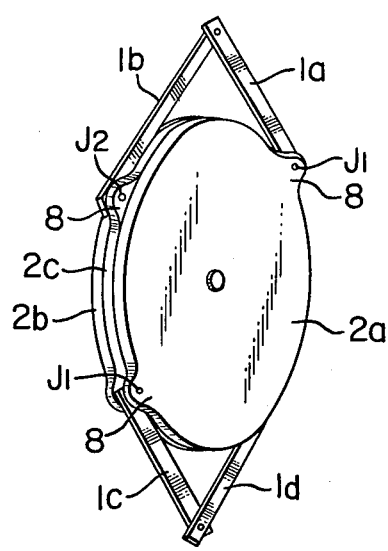
FIG. 8 is a schematic perspective view of a fourth embodiment of the present invention which includes three discs.

FIG. 8 is a schematic perspective view of a fourth embodiment of the vibration damping apparatus according to the present invention which comprises three discs 2a, 2b, 2c and two pairs of link bars 1a, 1b and 1c, 1d. The link bar pairs are disposed opposite to each other in the diametrical direction of the discs.

In this fourth embodiment, each of the three discs 2a, 2b and 2c is provided with a pair of diametrically opposing ears 8. The two discs 2a and 2b among the three are disposed opposite to each other with their ears 8 aligned with each other, and these discs 2a and 2b are connected to each other by pins $J_1$ extending through the ears 8 respectively. The remaining disc 2c is interposed between the two discs 2a and 2b in such a relation that the ears 8 of the former are situated intermediate between the ears 8 of the latter. The openable legs of the link bars 1a and 1c are coupled at their free ends to the ears 8 of the discs 2a and 2b by the pins $J_1$ respectively, while the openable legs of the link bars 1b and 1d are coupled at their free ends to the ears 8 of the central disc 2c by pins $J_2$.

Figure 9:
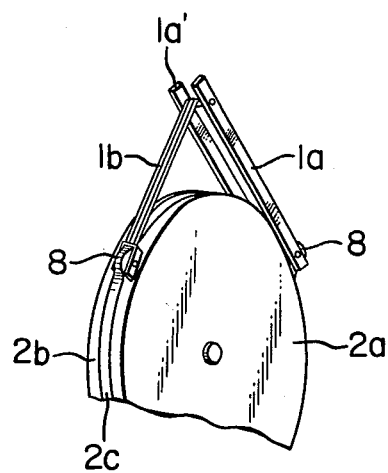
FIG. 9 is a schematic perspective view of part of a modification of the fourth embodiment shown in FIG. 8.

FIG. 9 shows a modification of the embodiment shown in FIG. 8. This modification comprises three link bars 1a, 1a' and 1b. The openable legs of the link bars 1a and 1a' are coupled at their free ends to the discs 2a and 2b disposed with their ears 8 aligned with each other, respectively, while the openable leg of the link bar 1b is coupled at its free end to the ear 8 of the central disc 2c.

In the embodiments shown in FIGS. 8 and 9, the resistance of the resistive body occurs at the two interfaces of the three discs. Therefore, the resistance force exhibited by the combination is two times as large as that of the combination of two discs having the same effective area.

Figure 10:
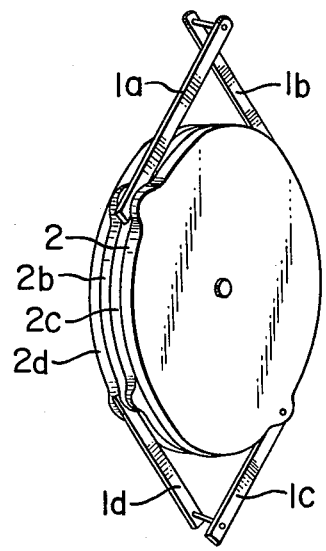
FIG. 10 is a schematic perspective view of a fifth embodiment of the present invention which includes four discs.

FIG. 10 is a schematic perspective view of a fifth embodiment of the vibration damping apparatus according to the present invention which comprises four discs 2a, 2b, 2c, 2d and two pairs of link bars 1a, 1b and 1c, 1d disposed opposite to each other in the diametrical direction of the discs. Referring to FIG. 10, the discs 2a and 2c rotate in a pair in one direction, while the discs 2b and 2d rotate in a pair in a direction opposite to the direction of rotation of the discs 2a and 2c. It will be readily seen that the resistance force exhibited by such a combination is three times as large as that exhibited by the combination of two discs.

Figure 11:
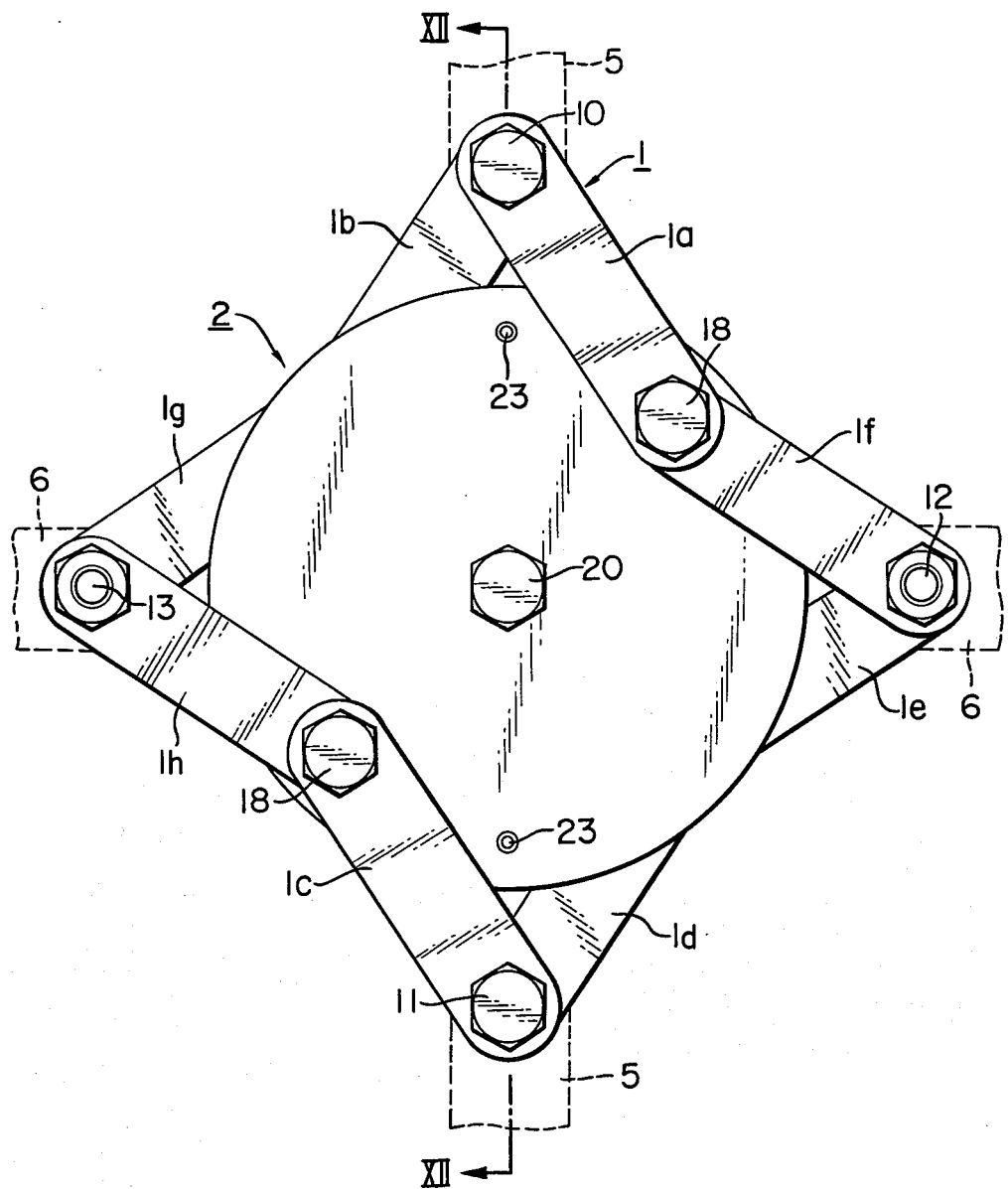
FIG. 11 is a front elevation view of a sixth embodiment of the present invention, showing a more practical form of the third embodiment shown in FIG. 4.
Figure 12:
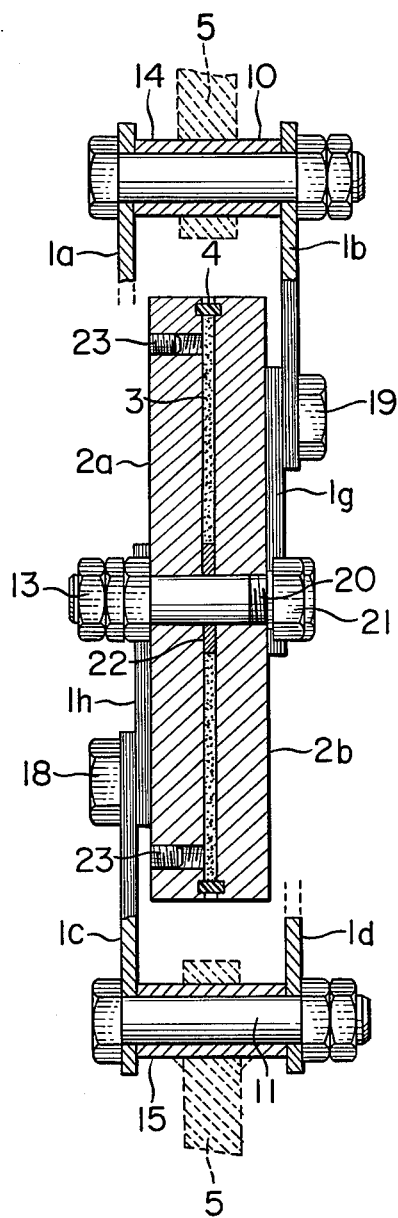
FIG. 12 is a sectional view of the sixth embodiment of the present invention taken along the line XII—XII in FIG. 11.

FIG. 11 shows a sixth embodiment or a more practical form of the embodiment shown in FIG. 4, when applied to the cross points of diagonal members in a framed structure. FIG. 12 is a sectional view taken along the line XII—XII in FIG. 11.

In FIGS. 11 and 12, reference numerals 1, 2 and 3 designate generally link bars, discs and a resistive body which is a material having a high viscosity in this embodiment, respectively.

Referring to FIGS. 11 and 12, two pairs of link bars 1a, 1b and 1c, 1d are disposed opposite to each other in the diametrical direction of the discs 2 for making open-close movement. Other two pairs of link bars 1e, 1f and 1g, 1h are similarly disposed opposite to each other in the diametrical direction orthogonal with respect to the direction of the former two pairs for making open-close movement opposite to that of the former two pairs.

The link bars 1a, 1c, 1e and 1g are pivoted to the link bars 1b, 1d, 1f and 1h by pivot pins 10, 11, 12 and 13 respectively, and these pivot pins 10, 11, 12 and 13 are received in sleeves 14, 15, 16 and 17 respectively. The free ends of the openable legs of the link bars 1a, 1f and 1c, 1h are coupled to one of the discs or disc 2a by pivot pins 18 respectively, and, similarly, the free ends of the openable legs of the link bars 1b, 1g and 1d, 1e are coupled to the other disc 2b by pivot pins 19 respectively.

A pin 20 extends through the common center of rotation of the discs 2a and 2b and is fixed in position by nuts 21. A spacer 22 is fitted on the pin 20 between the discs 2a and 2b to maintain a very small gap between the two discs 2a and 2b. These two discs 2a and 2b can rotate around the axis of the pin 20.

The resistive body or highly viscous material 3 is injected and filled in the very small gap through ports 23, and these ports 23 are closed by plugs after the material 3 has been completely charged to uniformly fill the very small gap defined between the discs 2a and 2b. In lieu of charging the highly viscous material 3 through the ports 23, the material 3 may be previously coated on the required areas of the disc surfaces during the step of assembling of the discs without providing the ports 23. It is especially desirable that the highly viscous material 3 be bubble-free and uniformly charged in the very small gap between the discs 2a and 2b.

A seal ring 4 is disposed to cover the outer peripheries of the opposing surfaces of the discs 2a and 2b to seal the very small gap defined between the disc 2a and 2b.

Diagonal members 5 such as braces are coupled to the sleeves 14 and 15 respectively, and similar diagonal members 6 are coupled to the sleeves 16 and 17 respectively.

Figure 13:
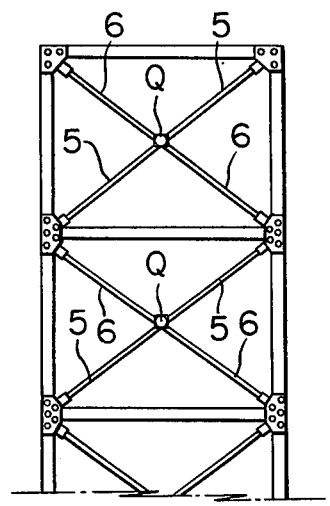
FIG. 13 is a schematic front elevation view of a frame structure including the apparatus according to the present invention therein.

FIG. 13 is a schematic front elevation view of a frame structure to illustrate that the vibration damping apparatus Q according to the present invention are disposed in the framework of the framed structure.

When deformation occurs in the plane including the diagonal members 5 and 6 due to, for example, an earthquake, a tensile force is imparted to, for example, the diagonal members 5, and a compressive force is imparted to, for example, the diagonal members 6, thereby producing a stress in these diagonal members 5 and 6. In such a case, the link bars in each of the vibration damping apparatus Q act to rotate the two discs in directions opposite to each other, and the viscous torsional resistance force produced in the highly viscous material charged in the very small gap defined between the discs acts to alleviate the vibration of the framed structure.

It will be seen from the aforementioned embodiments that the vibration damping apparatus of the present invention comprises link bars functioning as a driver and discs coupled to the link bars to function as a follower. The discs constituting the follower are rotated in directions opposite to each other in response to the open-close movement of the link bars constituting the driver. Therefore, when the embodiments of the present invention are compared with, for example, a prior art vibration damping apparatus in which one of two discs acts as a stationary resistive member and the other acts as a relatively rotatable resistive member, the discs constituting the driver can make relative rotation through a rotation angle which is substantially two times as large as that of the prior art apparatus, and slight movement of the driver can efficiently provide a great resistance to vibration.

Further, the vibration damping apparatus of the present invention is distinguished from another prior art vibration damping apparatus of dashpot type in which flow of a fluid material (a viscous material) caused as a result of impartation of an internal pressure to the material itself is utilized for vibration damping. Further, because of the fact that the viscous material employed in the present invention has a high viscosity, there is substantially no possibility of leakage of the viscous material to the exterior from the vibration damping apparatus. Therefore, the structure need not be strictly pressure-resistive or fluid-tight, and the vibration damping apparatus of simple construction can efficiently attain the desired object.

Figure 14A:
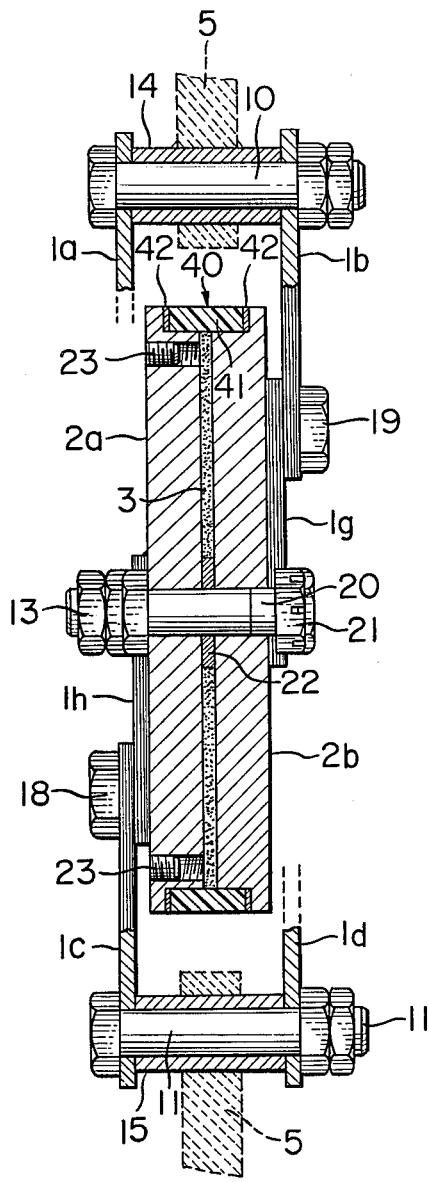
FIG. 14a is a sectional view of a seventh embodiment of the present invention.

FIG. 14a shows a seventh embodiment, and reference numerals 1a to 23 designate the same parts as those appearing in FIGS. 11 and 12, and any detailed description thereof is unnecessary.

The embodiment shown in FIG. 14a is featured by the use of a resilient member 40 in addition to the highly viscous material as the resistive body 3. This resilient member 40 is illustrated in the form of an annular resilient member of rubber in FIG. 14a. This annular resilient member 40 includes a rubber ring 41 and a pair of annular reinforcing plates of metal 42 secured integrally to the both side surfaces respectively of the rubber ring 41.

Such an annular resilient member 40 is fixedly positioned in the annular groove formed in the outer peripheral area of the disc assembly with the reinforcing metal plates 42 bonded to the walls of the groove as by an adhesive. In response to impartation of vibration due to, for example, an earthquake, a torsional sheering stress is produced in the annular resilient member 40, and a viscous sheering resistance force is produced in the highly viscous material 3 charged in the very small gap defined between the discs 2a and 2b, thereby damping and alleviating the vibration of the framed structure.

Figure 14B:
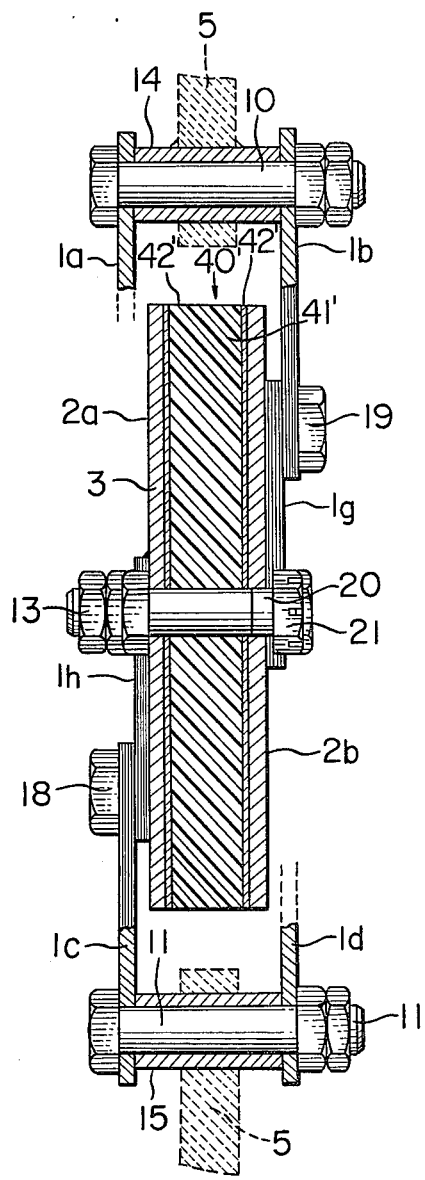
FIG. 14b is a sectional view of an eighth embodiment of the present invention.

FIG. 14b shows an eighth embodiment, and reference numerals 1a–21 designate the same parts as those appearing in FIGS. 11 and 12, and any detailed description thereof is unnecessary.

The embodiment shown in FIG. 14b is featured by the use of a resilient member 40' as the resistive body, instead of the high viscous material 3 shown in FIG. 14a. The resilient member 40' includes a rubber body 41' and a pair of reinforcing plates of metal 42' secured integrally to the both side surfaces respectively of the rubber body 41' and also to the discs 2a, 2b.

Figure 15:
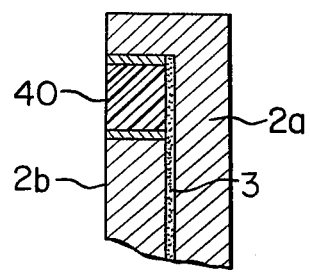

FIG. 15 is a sectional view of part of the apparatus to illustrate another manner of disposition of the annular resilient member 40 in the embodiment of the present invention shown in FIG. 14a.

Figure 16:
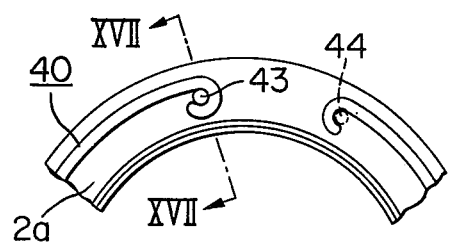
FIG. 16 is a plan view of part of a modification of the seventh embodiment shown in FIG. 14a, in which the resilient member of rubber is replaced by a spring which is generally annular in shape.
Figure 17:
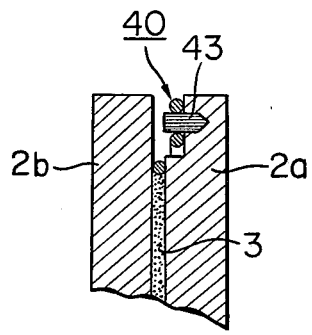
FIG. 17 is a sectional view taken along the line XVII—XVII in FIG. 16.

FIGS. 16 and 17 show a modification of the embodiment shown in FIG. 14a, in which the annular resilient member of rubber is replaced by a spring 40 which is generally annular in shape. Referring to FIGS. 16 and 17, the generally annular spring 40 is anchored at one end thereof to the disc 2a by a pin 43 and at the other end thereof to the other disc 2b by a pin 44. In this modification too, the spring 40 is as effective as the annular resilient member of rubber employed in the embodiment shown in FIG. 14a.

Figure 18:
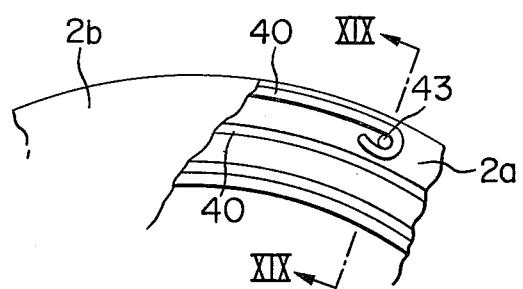
FIG. 18 is a plan view of part of a modification of the apparatus shown in FIGS. 15 and 16, in which a spiral spring is used.
Figure 19:
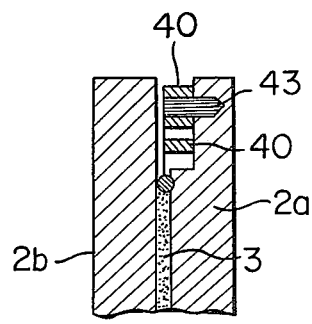
FIG. 19 is a sectional view taken along the line XIX—XIX in FIG. 18.

FIGS. 18 and 19 show a modification of the embodiment shown in FIGS. 16 and 17. In the modification shown in FIGS. 18 and 19, the annular spring is replaced by a spiral spring 40 making a plurality of turns between the discs 2a and 2b, so that it has sufficient margin in its resiliency.

The embodiments shown in FIGS. 14a to 19 employ the combination of the highly viscous material and the resilient member. Therefore, when the rate of deformation occuring in the plane of the framework of a framed structure is very slow, the combination of the highly viscous material and the resilient member permits deformation under a certain constant restraining force, while when the rate of deformation is relatively rapid as when deformation is caused by, for example, an earthquake or a strong wind, the combination of the highly viscous material and the resilient member produces a great resistance force thereby absorbing the horizontal or lateral vibration imparted to the framed structure and sufficiently damping the amplitude of vibration so as to enhance the resistance to vibration.

FIGS. 20 to 23 show a ninth embodiment, its modification, a tenth embodiment and its modification, respectively. In the embodiments, four link bars are pivoted to each other at their ends by pivot pins to constitute a quadric crank mechanism capable of turning around the axes of the pivot pins.

A plurality of rotatable members or discs are combined with these link bars. The two link bars disposed opposite to each other among the four link bars are coupled at their middle points to the corresponding points of one of two discs respectively, which points are located near the periphery of the disc and are spaced apart by the same distance from the center of rotation of the disc, or such link bars are coupled at their middle points to connecting means connecting together, as a group, the alternate ones of the discs rotating in the same direction. Similarly, the remaining two link bars disposed opposite to each other are coupled at their middle points to corresponding points of the other disc respectively, which points are located near the periphery of the disc and are spaced apart by the same distance from the center of rotation of the disc, or such link bars are coupled at their middle points to connecting means connecting together, as a group, the alternate ones of the discs rotating in a direction opposite to the direction of rotation of the former group. This embodiment differs from the aforementioned embodiments in the arrangement just described.

In such an assembly of the quadric crank mechanism and discs in this embodiment, deformation of the quadric crank mechanism can be converted into relative rotation of the discs in the opposite directions, provided that the distance between the center of rotation of each of the discs and the coupled point at the middle of each of the link bars is equal to the distance between the coupled point and the pivoted points of each of the link bars.

If the dimensional relation above described were not satisfied, it would be unable, theoretically, to convert the deformation of the quadric crank mechanism into the relative rotation of the discs. In other words, it is impossible to cause deformation of the quadric crank mechanism itself.

Figure 20:
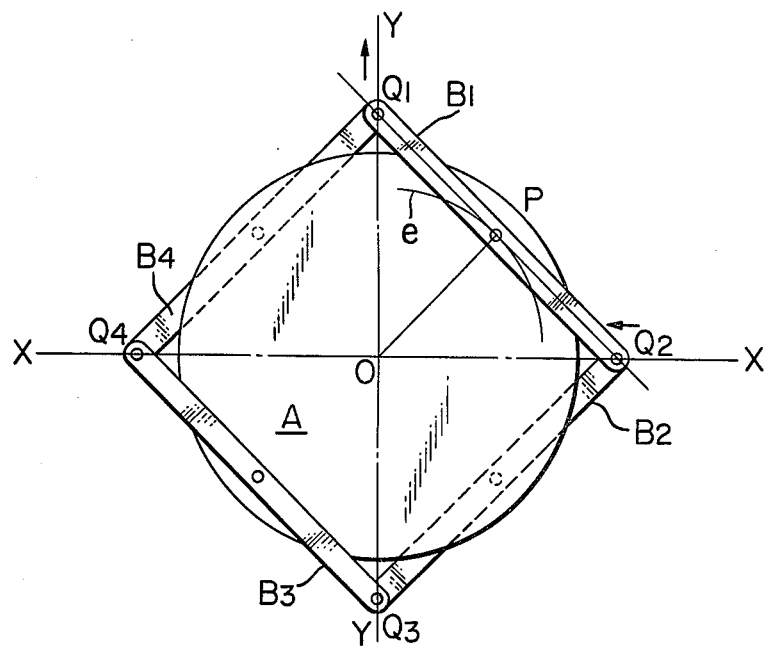
FIG. 20 is a schematic front elevation view of a ninth embodiment of the present invention illustrating a manner of coupling between a quadric crank mechanism and rotatable members.

Therefore, a coupling arrangement satisfying such a condition is generally employed in this embodiment, as schematically illustrated in FIG. 20.

Referring to FIG. 20, four link bars $B_1$, $B_2$, $B_3$ and $B_4$ of equal length are pivoted to each other at points $Q_1$, $Q_2$, $Q_3$ and $Q_4$. The link bar $B_1$ is coupled at its middle point P to one of two discs or disc A by a pin. Symbol O designates the center of rotation of the disc A, and the relation $OP = PQ_1$ ($= PQ_2$) is satisfied. Suppose now that the points $Q_1$ and $Q_3$ move on the axis Y—Y in a direction shown by the arrow, and the points $Q_2$ and $Q_4$ move on the axis X—X in a direction shown by the arrow, thereby causing deformation of the quadric crank mechanism. The, the point P describes an arc e of radius OP around the center of rotation of the disc A.

In this connection, it is not correct to conclude that the combination of the crank mechanism and the disc would not satisfactorily operate unless the aforementioned dimensional relation is satisfied even when a very limited condition is given.

This will be explained with reference to FIG. 21 in which the link bar $B_1$ is replaced by a link bar $B_1'$ and the distance $PQ_1'$ ($= PQ_2'$) is, for example, larger by about 30% than the distance OP.

Figure 21:
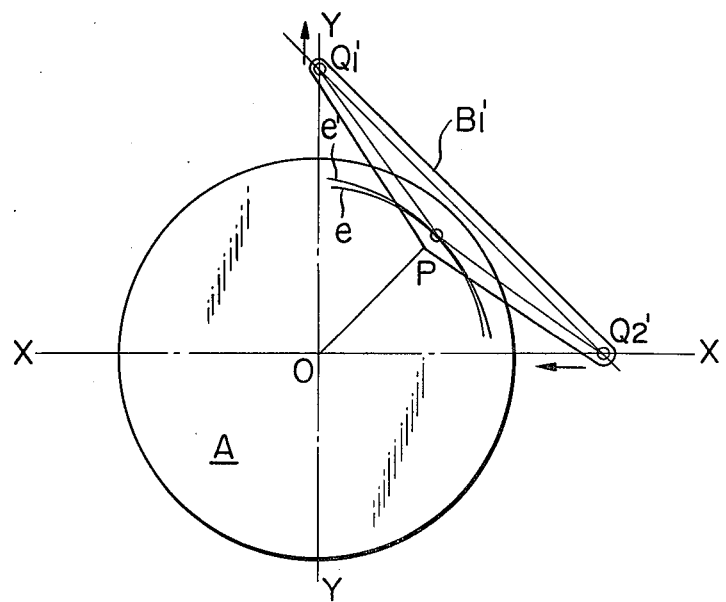
FIG. 21 is a partial front elevation view showing a modification of FIG. 20, in which another manner of coupling slightly different from that shown in FIG. 20 is illustrated for only one of the link bars.

Suppose now that points $Q_1'$ and $Q_2'$ in FIG. 21 move on the X—X axis and Y—Y axis in the directions shown by the arrows respectively. Unlike the case of FIG. 20, the point P does not describe the arc e whose radius is OP. In the case of FIG. 21, the point P describes a locus e' which deviates outward from the arc e. Therefore, the coupled assembly of the link bars and the discs shown in FIG. 21 is theoretically unable to satisfactorily operate, but, actually, it can effectively operate within a certain limited range.

The reason will now be explained. The degree of deviation of the locus e' from the arc e is dependent upon the dimensional difference between OP and $PQ_1'$ ($PQ_2'$) and upon the displacement of the point P in the circumferential direction (the rotation angle of OP). Since the length of $PQ_1'$ ($PQ_2'$) is larger by about 30% than that of OP, and the rotation angle of OP is about 10° (about 20° in terms of the relative rotation angle of the two discs), the locus e' is very close to the arc e.

Further, at the relatively turnable connections such as the pivoted connections between the link bars and the coupled connections between the link bars and the discs, a suitable clearance is provided between the pin and the pin-ceceiving hole in all of the connections to ensure smooth turning of the former relative to the latter.

Therefore, under a very limited condition, slight deviation of the locus e' from the arc e is absorbed by the clearance provided in the relatively turnable connections so that the coupled assembly can effectively operate under such a limited condition. This clearance may be similar to that commonly employed in a fit between mechanical parts and thus need not be excessively larger than required, because an unnecessarily large clearance will give rise to rather a bad result.

An example of the present embodiment of the vibration damping apparatus applicable under such a very limited condition is that used in the crossing of diagonal members of a framed structure.

The combination of the link bars and the discs shown in FIG. 21 provides the following advantages among other:

(1) The pivoted points Q' can be located at positions more distant in the radial direction from the periphery of the disc A than in the case of FIG. 20 when the point P is spaced from the center O by the same distance as that in FIG. 20. Therefore, the rotation torque is not substantially reduced, and the freedom of deformation of the crank mechanism can be made greater. (It will be pointed out in this connection that the freedom of deformation of the crank mechanism shown in FIG. 20 is extremely limited.)

(2) The assembly can be so configured as to improve the rigidity of the link bars.

In this embodiment too, the resistive body disposed between the discs is a material having a high viscosity or a resilient member or the combination of the highly viscous material and the resilient member.

Figure 22:
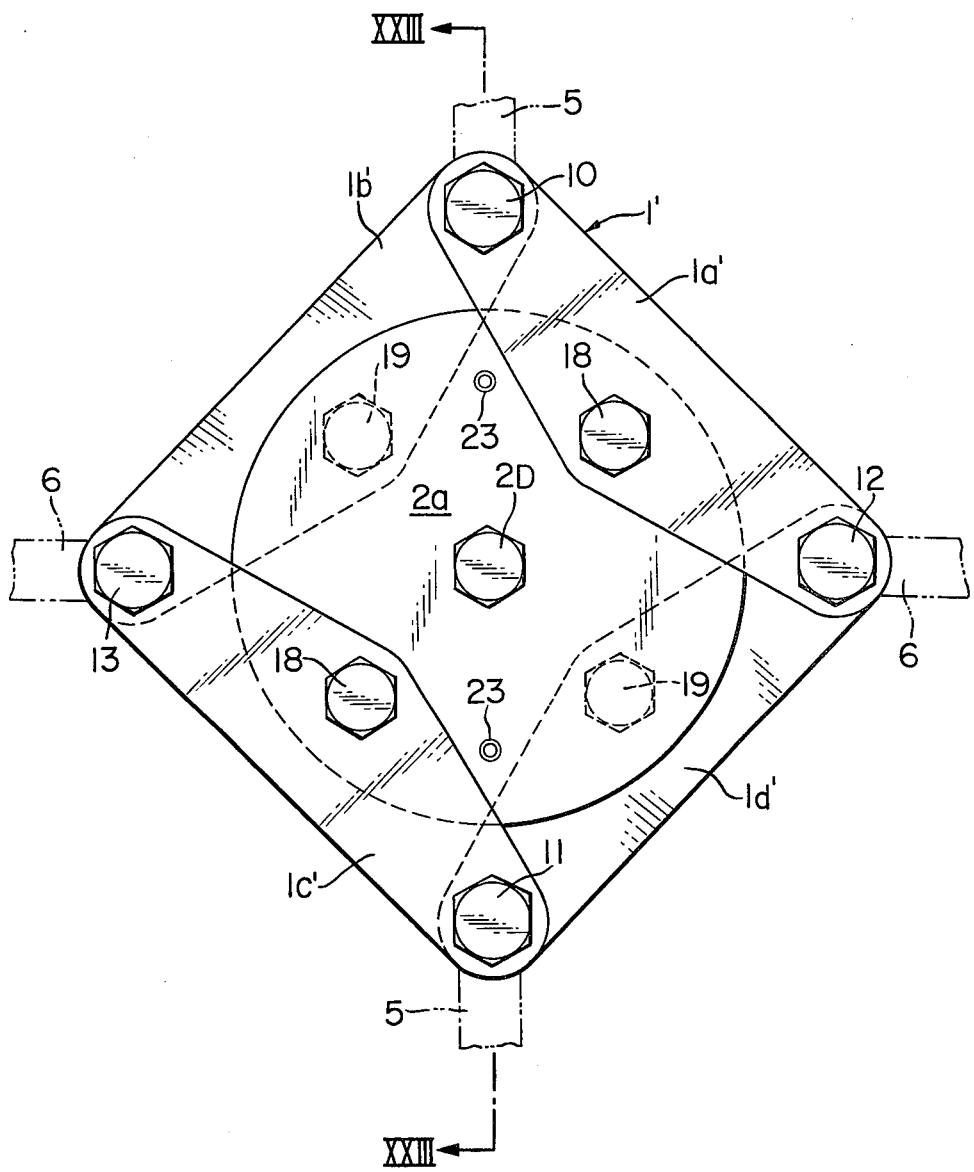
FIG. 22 is a front elevation view of a tenth embodiment of the present invention which is used in the cross point between diagonal members of a framed structure.
Figure 23:
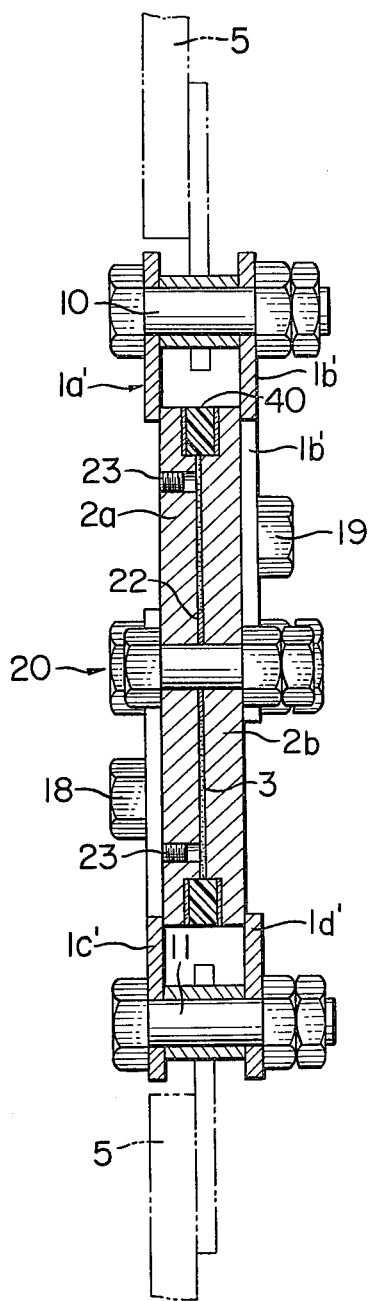
FIG. 23 is a sectional view taken along the line XXIII—XXIII in FIG. 22.

FIG. 22 is a front elevation view of a more practical form of the above embodiment, and FIG. 23 is a sectional view taken along the line XXIII—XXIII in FIG. 22.

This tenth embodiment exhibits substantially the same function as that exhibited by the seventh embodiment shown in FIG. 14a, and, therefore, like reference numerals are used in FIGS. 22 and 23 to designate like or equivalent parts appearing in FIG. 14.

Link bars $1a'$, $1b'$, $1c'$ and $1d'$ have the same length, and these link bars are pivoted at their ends to each other by pivot pins 10, 11, 12 and 13 as shown.

These four link bars $1a'$, $1c'$ and $1b'$, $1d'$ of the same length are coupled at their middle point to two discs $2a$ and $2b$ by coupling pins 18 and 19 respectively, so that the link bars can turn around the axes of the couling pins respectively.

A connecting pin 20 extends through the centers of rotation of the discs $2a$ and $2b$. The distance between the axis of the pin 20 and the axis of the pin 18 is equal to the distance between the axis of the pin 20 and the axis of the pin 19, and the distance between the coupling pin and the pivot pin is larger than the distance above described.

According to the structure of the tenth embodiment comprising the quadric crank mechanism of four link bars and two discs, the number of required parts is small, and the apparatus of simple construction can yet efficiently achieve the desired object.

What is claimed is:

1. A vibration damping apparatus comprising two rotatable members disposed opposite to each other while defining a gap therebetween so as to be rotatable relative to each other around substantially a single axis of rotation, a resistive body disposed in the gap between said rotatable members, and four pairs of link bars, each link in each pair of link bars being pivoted to each other at one end thereof by a pin and coupled to said rotatable members in such a relation that the end of one of said link bars in each pair and the end of the adjoining one of said link bars in the next adjacent pair are coupled by pin means to the associated one of said rotatable members.

2. A vibration damping apparatus as claimed in claim 1, wherein said resistive body comprises a high viscosity material.

3. A vibration damping apparatus as claimed in claim 1, wherein said resistive body comprises a resilient member.

4. A vibration damping apparatus as claimed in claim 1, wherein said resistive body comprises a combination of a high viscosity material and a resilient member.

5. A vibration damping apparatus as claimed in claim 1, wherein said pin means includes a single pin.

6. A vibration damping apparatus as claimed in claim 1, wherein said pin means includes a pair of pins.

* * * * *